United States Patent
Lambert

(10) Patent No.: US 9,148,282 B2
(45) Date of Patent: Sep. 29, 2015

(54) METHOD TO CALCULATE SQUARE ROOTS FOR ELLIPTIC CURVE CRYPTOGRAPHY

(71) Applicant: Certicom Corp., Mississauga (CA)

(72) Inventor: Robert John Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 172 days.

(21) Appl. No.: 13/920,426

(22) Filed: Jun. 18, 2013

(65) Prior Publication Data

US 2014/0369492 A1     Dec. 18, 2014

(51) Int. Cl.
*H04L 9/30*     (2006.01)
*G06F 7/72*     (2006.01)

(52) U.S. Cl.
CPC ............... *H04L 9/3066* (2013.01); *G06F 7/72* (2013.01)

(58) Field of Classification Search
USPC .......................................................... 380/28
See application file for complete search history.

(56) References Cited

U.S. PATENT DOCUMENTS 5,627,893 A * 5/1997 Demytko ................ 380/30

FOREIGN PATENT DOCUMENTS

WO     WO 99/63426 A1     12/1999

OTHER PUBLICATIONS

Daniel J. Bernstein, "Faster Square Roots in Annoying Finite Fields," 2001 11/23.

Peter Hackman, *Elementary Number Theory*, HH Productions, 2009.
NSA, *Mathematical Routines for the NIST Prime Elliptic Curves*, Apr. 5, 2010.
Martin Kutz, "Lower Bounds for Lucas Chains," SIAM J. Comput., vol. 31, No. 6, pp. 1896-1908, 2002.
Peter L. Montgomery, "Evaluating Recurrences of Form Xm+n = f(Xm, Xn, Xm-n) via Lucas Chains," Dec. 13, 1983, Revised Mar. 1991, Jan. 1992.
Siguna Mueller, "On the Computation of Square Roots in Finite Fields," Designs, Codes and Cryptogrphy, vol. 31, pp. 301-312—, 2004, Springer.
Donald E. Knuth, STRONGCHAIN, Sections 1, 2, 7, 11, 18 and 23 (pp. 10).
Alfred J. Menezes, Paul C. van Oorschot, Scott A. Vanstone , "Handbook of Applied Cryptography", XP002137441; 1997, CRC Press, Boca Raton, FL, US, pp. 99-102.
Dong-Guk Han, Dooho Choi, Howon Kim, "Improved Computation of Square Roots in Specific Finite Fields", IEEE Transactions on Computers, vol. 58, No. 2, Feb. 2009, pp. 188-196.
Eric Bach, Klaus Huber, "Note on Taking Square-Roots Modulo", IEEE Transaction on Information Theory, vol. 45, No. 2, Mar. 1999, p. 807-809.
European Search Report, Dec. 20, 2013 for application No. 13172549.

* cited by examiner

*Primary Examiner* — Jacob Lipman
(74) *Attorney, Agent, or Firm* — Jon Gibbons; Fleit Gibbons Gutman Bongini & Bianco P.L.

(57) ABSTRACT

A method is presented to compute square roots of finite field elements from the prime finite field of characteristic p over which points lie on a defined elliptic curve. Specifically, while performing point decompression of points that lie on a standardized elliptic curve over a prime finite field of characteristic $2^{224}-2^{96}+1$, the present method utilizes short Lucas subsequences to optimize the implementation of a modified version of Mueller's square root algorithm, to find the square root modulo of a prime number. The resulting method is at least twice as fast as standard methods employed for square root computations performed on elliptic curves.

20 Claims, 3 Drawing Sheets

METHOD TO CALCULATE SQUARE ROOTS FOR ELLIPTIC CURVE CRYPTOGRAPHY

FIELD

The present disclosure is directed to a method of finding, for use in elliptic curve cryptography, square roots of elements in a finite field over which are defined the coordinates of points that lie on an elliptic curve.

BACKGROUND

An elliptic curve over a prime finite field is defined by a parameter p that is an integer that specifies a finite field $F_p$, over which points of the elliptic curve have their coordinates. For elliptic curves that have a parameter p of the form, p=3 mod 4 or p=5 mod 8, a square root of a number (representing a finite field element) can be easily computed by performing a single exponentiation modulo p operation. For elliptic curves such as the NIST 244 elliptic curve, the base prime number p, represented as $p_{244}$, is equal to $2^{224}-2^{96}+1$. For curves of this nature, $p_{244}=1$ mod 4 or 1 mod 8, and thus it is difficult to perform square root operations in a time efficient manner.

Tonelli's algorithm is a randomized algorithm that can be used for computing square roots of a number for such elliptic curves, but requires randomization to produce a single non-quadratic residue modulo p, after which it can compute multiple square roots. However, Tonelli's algorithm becomes inefficient when p−1 contains many factors of 2.

Further, the Bernstein algorithm improves on Tonelli's algorithm by using a pre-computation approach. Specifically, Bernstein maintains a table of field elements. Further reduction in computation time is obtained at the expense of a larger table. For example, by using a table that maintains 1024 elements, Bernstein achieves square root calculations with 364 multiplication operations. With a table having 3072 elements, the number of multiplication operations could be reduced to 304 and with a table of 32768 elements, the number of multiplication operations could be reduced to 258 multiplication operations.

Legendre's method finds a square root of a number q by using a quadratic extension approach. Specifically, Legendre computes the square root of a number q by computing $(r^2-q)^{(p+1)/2}$, wherein r is a randomly generated number. In order to compute the square root, it ensures that $r^2-q$ is a non-square. Legendre repeatedly chooses a uniform r until the quantity $r^2-q$ is a non-square. However, Legendre's method, like many other square root algorithms, works in a quadratic extension, where operations are more expensive than operations on the base finite field.

BRIEF DESCRIPTION OF THE DRAWINGS

A more complete appreciation of the embodiments described therein, and many of the attendant advantages thereof will be readily obtained as the same becomes better understood by reference to the following detailed description when considered in connection with the accompanying drawings, wherein.

DETAILED DESCRIPTION

Figure 1:
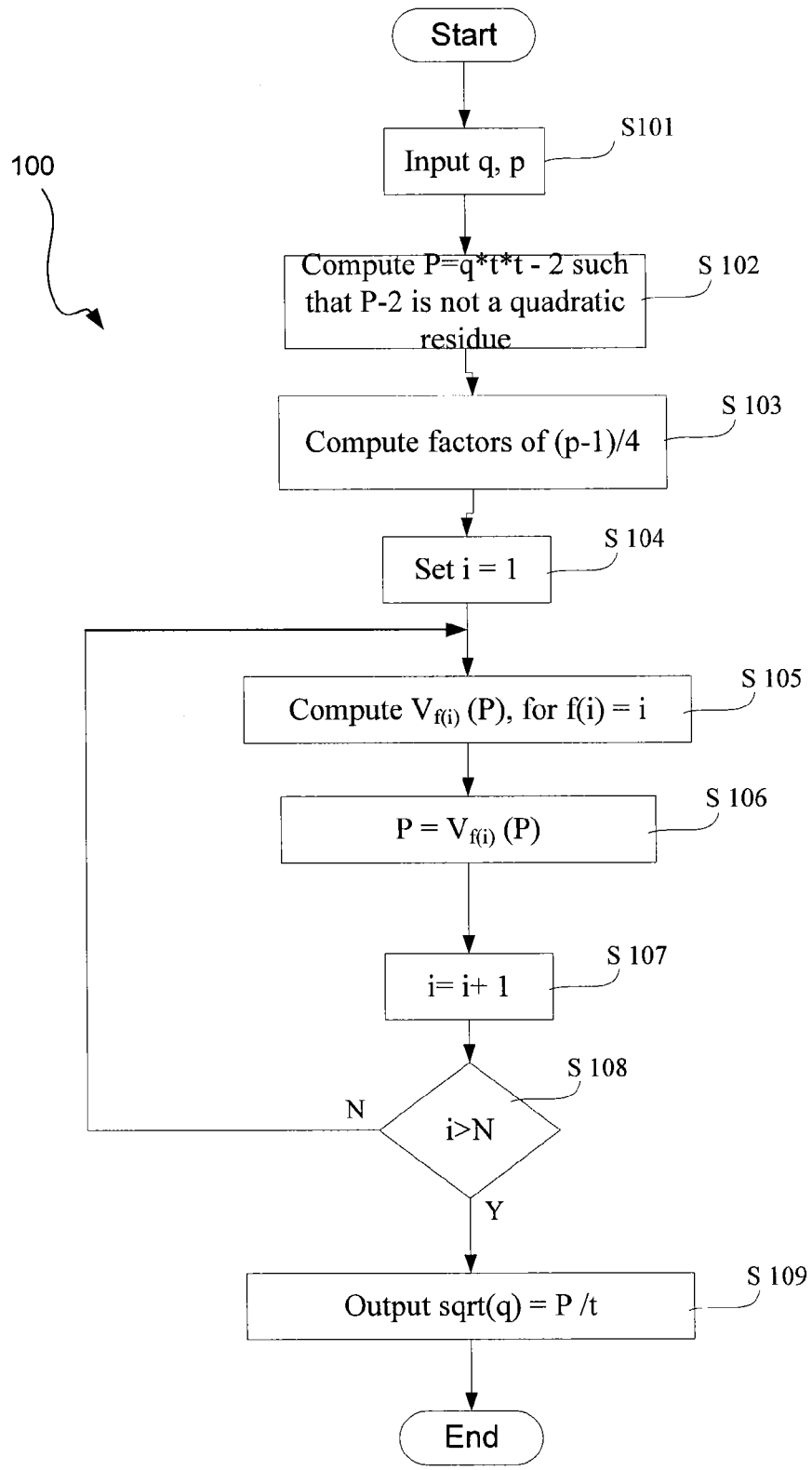
FIG. 1 illustrates a method to compute the square root of a number in a finite field according to one embodiment.

While performing compression/decompression of points of an elliptic curve over a prime field, a square root modulo a prime number of the elliptic curve is obtained by the present embodiments by utilizing short Lucas sub-sequences to optimize the implementation of a modified version of Mueller's square root algorithm. The resulting method is at least twice as fast as standard methods employed for square root computations performed for elliptic curves.

The present embodiments are aimed at reducing the operation counts of the methods described above and present a time-effective algorithm to compute the square roots of elements from a finite field, used to represent coordinates of points which lie on the elliptic curve.

According to a first embodiment, there is provided a method of computing a square root of an element q of a prime finite field of characteristic p for use in elliptic curve cryptography, the method comprising: (1) determining a value of a finite field element t yielding an initial value P=q*t*t−2 such that P−2 is not a quadratic residue; (2) calculating a factored representation of (p−1)/4, the factored representation consisting of a set of factors that, when multiplied together, yield (p−1)/4; (3) calculating a value of a Lucas function of P for one of the factors of the set of factors; (4) setting P to the computed Lucas function value; (5) computing a Lucas function value of P for another factor of the set of factors; (6) repeating the setting and computing steps for a remaining factors of the set of factors in the factored representation of (p−1)/4 to generate a final Lucas function value; and (7) outputting the square root of the finite field element q, the square root being calculated as the final Lucas function value divided by the element t.

When the order of 2 in the finite field is large enough to make the choice of P=q*t*t−2 large enough that some P−2 will be, in practice, a quadratic non-residue, then, as an added efficiency, t may be selected as a power of 2, i.e., $2^c$ for some integer c. Then P is selected as $p=2^{(2c)}q-2$, and division by $2^c$ of the Lucas function result may be calculated more efficiently than if t was selected, for example, at random.

According to this second embodiment, there is provided a non-transitory computer-readable medium having stored thereon a program that when executed by a computer causes the computer to execute the steps of: (1) determining an initial value P=$2^{(2c)}$*q−2 such that P−2 is not a quadratic residue; (2) calculating a factored representation of (p−1)/4, the factored representation consisting of a set of factors that, when multiplied together, yield (p−1)/4; (3) calculating a value of a Lucas function of P for one of the factors of the set of factors; (4) setting P to the computed Lucas function value; (5) computing a Lucas function value of P for another factor of the set of factors; (6) repeating the setting and computing steps for all remaining factors of the set of factors in the factored representation of (p−1)/4 to generate a final Lucas function value; and (7) outputting the square root of the finite field element q, the square root being calculated as the final Lucas function value divided by $2^c$.

According to a third embodiment, there is provided an apparatus to perform a square root computation of an element q of a prime finite field of characteristic p on which the coordinates of an elliptic curve are defined, for use in elliptic curve cryptography, comprising a processor configured to: (1) determine a value of a finite field element t yielding an initial value P=q*t*t−2 such that P−2 is not a quadratic residue; (2) calculate a factored representation of (p−1)/4, the factored representation consisting of a set of factors that, when multiplied together, yield (p−1)/4; (3) calculate a value of a Lucas function of P for one of the factors of the set of factors; (4) set P to the computed Lucas function value; (5) compute a Lucas function value of P for another factor of the set of factors; (6) repeat the setting and computing steps for all remaining factors of the set of factors in the factored representation of (p−1)/4 to generate a final Lucas function value; and (7) output the square root of the finite field element q, the square root being calculated as the final Lucas function value divided by the element t.

An elliptic curve is often represented by parameters that comprise a tuple (p, a, b, G, n, h) wherein p is an integer specifying the finite field $F_p$; a, b are the field elements; G is the base point; n is the order of G and h is the cofactor of n. Note that when $p=2^m$, an irreducible polynomial determines and reduces the elements of the field $F_2^m$ where the two elements a, b define an equation of an elliptic curve $E[F_p]$, with a base point $G=(x_G, y_G)$ of order n. In the embodiments disclosed herein, the finite field is of prime order.

In elliptic curve arithmetic, a point on the elliptic curve can be represented in several forms. For example, in an affine representation of a point S on the elliptic curve, the point S can be represented as a pair $S=(S_x, S_y)$ of the elements $F_p$ that satisfy the elliptic curve equation such as $y^2=x^3-3x+b \bmod p$. In a compressed representation of S, denoted by S', the point can be represented as the affine coordinate $S_x$, along with the least significant bit $(S_y)_0$ of the affine y coordinate $S_y$. Given a point in the compressed form of representation, one can obtain the affine representation of the point by performing a modular square root operation.

Signature schemes implemented in elliptic curve cryptography are designed to be the digital equivalent of handwritten signatures. They are used to provide authentication, data-integrity, and non-repudiation. Such signature schemes often require decompression of points that lie on the elliptic curve in order to efficiently represent elliptic curve points, these points being used to represent the signer's public key. Accordingly, there is a requirement of a time-effective method of computing modular square roots.

In what follows, a method of computing square roots by utilizing short Lucas sub-sequences to optimize the implementation of a modified version of Mueller's square root algorithm is first described and later a method to compute an initial value for a Lucas parameter that is used in the computation of the modular square root is described.

FIG. 1 describes an exemplary method of computing modular square roots. A specific implementation of the Lucas sequence is first described.

A Lucas sequence can be characterized by a Lucas function $V_n$ that is used to compute the square roots. The Lucas function can be recursively defined as follows:

$$V_0(P,Q)=2 \qquad (1)$$

$$V_1(P,Q)=P \qquad (2)$$

$$V_{m+n}(P,Q)=V_m V_n - Q^m V_{n-m} \bmod p \qquad (3)$$

wherein P and Q are elements of the field. Upon choosing a suitable value for the parameter P, such that $P^2-4Q$ is not a quadratic residue modulo p, the square roots of Q can be computed as:

$$\pm((p+1)/2)V_{(p+1)/2}(P,Q) \bmod p \qquad (4)$$

However, for finding modular square roots for the elliptic curves wherein p=1 mod 4 (including when p=1 mod 8), the above method can be improved. Mueller has shown that streamlined computation can be achieved by setting the Lucas parameter Q=1. Therefore, for p=1 mod 4 (p is a prime), and q being a quadratic residue, whose square root is desired, one can choose a parameter t, such that $qt^2-4$ is not a quadratic residue.

For the sake of completeness, the term quadratic residue is defined as follows: an integer q is called a quadratic residue modulo n if it is congruent to a perfect square modulo n, i.e., if there exists an integer x such that: $x^2 \equiv q \pmod{n}$.

Upon ensuring that the entity $qt^2-4$ is not a quadratic residue, the Lucas parameter P is set to be equal to $qt^2-2$. Then the square root of q mod p is obtained as follows:

$$V_{(p-1)/4}(P,1)/t \bmod p \qquad (5)$$

Thus the square root of q mod p can be obtained by computing the Lucas function $V_n(P, 1)$, where n=(p−1)/4. The Lucas function can be computed by using a binary expansion of n of length lg(n), wherein each bit of n requires a squaring and a multiplication operation. Thus, in total the binary expansion method utilizes approximately lg(n) squaring operations and lg(n) multiplication operations.

For the NIST $p_{244}$ prime, the binary expansion method requires roughly 224 multiplications and 224 squaring operations. In one embodiment the number of squaring and multiplication operations is reduced by taking advantage of the large number of factors of $(p_{244}-1)/4$ that are equal to two. Specifically, consider the Lucas function $V_{2m}(P,1)$ expressed as follows:

$$V_{2m}(P,1)=(V_m(P,1))^2-2 \qquad (6)$$

The expression in (6) can be computed with a single squaring operation as opposed to a squaring and multiplication operation as required by the binary method. The factors of $(p_{244}-1)/4$ can be expressed in a general form as follows:

$$(p_{244}-1)/4=f_1^* f_2^* f_3^* \ldots f_{N-1}^* F_N \qquad (7)$$

The factors for the large prime number $(p_{244}-1)/4$ can be obtained by any standard technique. It turns out that the prime factors for this particular elliptic curve can be expresses as follows:

$$(p_{224a}-1)/4=2^{94} \cdot 3 \cdot 5 \cdot 17 \cdot 257 \cdot 641 \cdot 65537 \cdot 274177 \cdot 6700417 \cdot 67280421310728) \qquad (8)$$

One possibility for composing the factors $f_i$ of equation (7) is to assign a single prime factor to each $f_i$. Alternately, more than one of the prime factors can be assigned to a single factor $f_i$. In other words, the factors of equation (7) need not be prime factors. With this in mind, the Lucas function $V_m(P, 1)$ can be composed as follows:

$$V_{mn}(P,1)=V_m(V_n(P,1),1) \qquad (9)$$

Note that (9) is obtained by using the multiplicative property of the Lucas sub-sequences. Considering (8) and (9), note that at least 94 multiplication operations can be eliminated by utilizing just the 2-factors of $(p_{244}-1)/4$. Accordingly, the Lucas function $V_{(p-1)/4}(P)$ can be expressed in a recursive manner as a composition of smaller Lucas sub-shains:

$$\frac{V_{p-1}}{4}(P) = V_{fN}(V_{fN-1}( \ldots \ldots \ldots (V_{fa}(V_{f2}(V_{f1}(P))) \ldots \ldots ))) \qquad (10)$$

In the evaluation of each Lucas function $V_{fi}()$, we are free to employ the shortest Lucas sequence for $V_{fi}()$ that is available. Shorter Lucas sequences require less computation to evaluate. For small factors $f_i$, we can, through searching, find Lucas sequences of minimal length, but for larger factors, we can still find short, if not necessarily minimal, Lucas sequences through heuristic search. Since the above form depends only on p, and we are likely to perform many square roots modulo p, we can spend some effort on finding short Lucas subsequences for each factor above.

The shortest Lucas sequence for $V_n$, when n=2=[1,2]. A shortest for n=3 is [1,2,3]; for 5 [1,2,3,5]; for 17 [1, 2, 3, 5, 7, 10, 17]; for 257 [1, 2, 3, 5, 7, 12, 19, 31, 50, 69, 119, 138, 257]; for 641 [1, 2, 3, 5, 7, 12, 19, 24, 43, 67, 110, 177, 287, 354, 641]. Shorter Lucas sequences allow less computation when evaluating a Lucas function. For larger n's, it is more difficult to compute minimal Lucas sequences, but good sequences can be found with heuristic searches. For example, a good sequence for 65537 is [1, 2, 3, 5, 7, 12, 17, 22, 39, 56, 95, 151, 246, 397, 643, 1040, 1437, 2477, 3517, 5994, 9511, 15505, 25016, 40521, 65537]; for 274177 [1, 2, 3, 5, 8, 13, 21, 34, 47, 81, 128, 209, 337, 546, 883, 1429, 2312, 3195, 5507, 8702, 11897, 20599, 32496, 53095, 73694, 126789, 200483, 274177]; for 6700417 [1, 2, 3, 5, 7, 12, 19, 31, 50, 81, 131, 212, 343, 555, 898, 1241, 2139, 3380, 4621, 8001, 12622, 20623, 28624, 49247, 69870, 119117, 188987, 308104, 497091, 805195, 1302286, 1799377, 3101663, 4901040, 6700417]; for 67280421310721 [1, 2, 3, 5, 8, 13, 21, 34, 55, 76, 131, 186, 317, 503, 820, 1323, 2143, 2963, 5106, 7249, 12355, 17461, 29816, 47277, 77093, 106909, 184002, 290911, 474913, 765824, 1056735, 1822559, 2588383, 4410942, 6999325, 11410267, 18409592, 25408917, 43818509, 62228101, 106046610, 168274711, 230502812, 398777523, 567052234, 965829757, 1364607280, 2330437037, 3296266794, 5626703831, 8922970625, 14549674456, 20176378287, 34726052743, 54902431030, 89628483773, 144530914803, 199433345833, 343964260636, 543397606469, 887361867105, 1430759473574, 2318121340679, 3748880814253, 6067002154932, 9815882969185, 15882885124117, 25698768093302, 41581653217419, 67280421310721].

When evaluating a Lucas function $V_n$ (P,Q) using a Lucas (sub) sequence, values are determined from previous elements in the sequence, e.g., as determined from equations (3), (6), and (9). For example, when computing the Lucas subsequence from [1, 2, 3, 5, 7, 10, 17], we calculate $V_{17}$ (P, 1), or just "$V_{17}$" for short, as follows:

$V_2 = (P*P-2) \bmod p$ $V_3 = (V_2*P-P) \bmod p$ $V_5 = (V_3*V_2-P) \bmod p$ $V_7 = (V_5*V_2-V_3) \bmod p$ $V_{10} = (V_5*V_5-2) \bmod p$ $V_{17} = (V_{10}*V_7-V_3) \bmod p$ Turning, to FIG. 1, we explain the method 100, executed to compute the modular square root of an element from a finite field of order p. For example, the base prime number p can be $p_{244}$, which is equal to $2^{224}-2^{96}+1$.

In step S101, the input parameter p is set. Further, q is an integer whose square root is desired.

In step S102, the initial Lucas parameter P is computed as $P=qt^2-2$ for a finite field element t such that P-2 is not a quadratic residue. The specific details on the computation of t and the initial value of P are explained later with reference to FIG. 2.

In step S103, the prime factors of (p-1)/4 are computed as shown in (7). Note that the prime factors can be computed by any factorization technique. In one example, as shown in (8), it can be observed that the number of distinct prime factors for $(p_{244}-1)/4$ are ten, but the total number of prime factors is 103. In a typical embodiment, the factors will be taken to be the prime factors of (p-1)/4, but in general, factors composed of multiple prime factors may be employed, in which case the number of factors will be less since some factors will combine prime factors.

In step S104, a counter i is initialized to i=1. The counter i is used to keep a track of the current Lucas function being computed.

In Steps S105 to S108, a loop is executed that continuously computes the Lucas functions. Specifically, for a value of i=1, in step S105, a Lucas function $V_{f_i}(P)$ is computed. Note that the computation of the successive Lucas functions can be computed by using the relationship set forth in (1)-(3) and (9).

In step S106, the value P is assigned a value of the most recently computed Lucas function of step S105.

In step S107, the value of the counter i is incremented by one.

In step S108, a query is made to check whether the value of the counter i exceeds N, the total number of factors used to represent (p-1)/4. If the response to the query is negative, the method loops back to step S105, wherein the Lucas function for another factor is computed. If the response to the query is affirmative, the process proceeds to step S109.

In step S109, the square root of q modulo p (denoted as sqrt (q)), is computed by dividing the last computed value of the value P, by the element t. In one embodiment, the parameter P is divided by $t=2^c \bmod p$, wherein c is an integer that is computed by the method of FIG. 2 from an appropriate starting value for the Lucas parameter P. The method of FIG. 2 returns the integer c such that the element $t=2^c \bmod p$.

Figure 2:
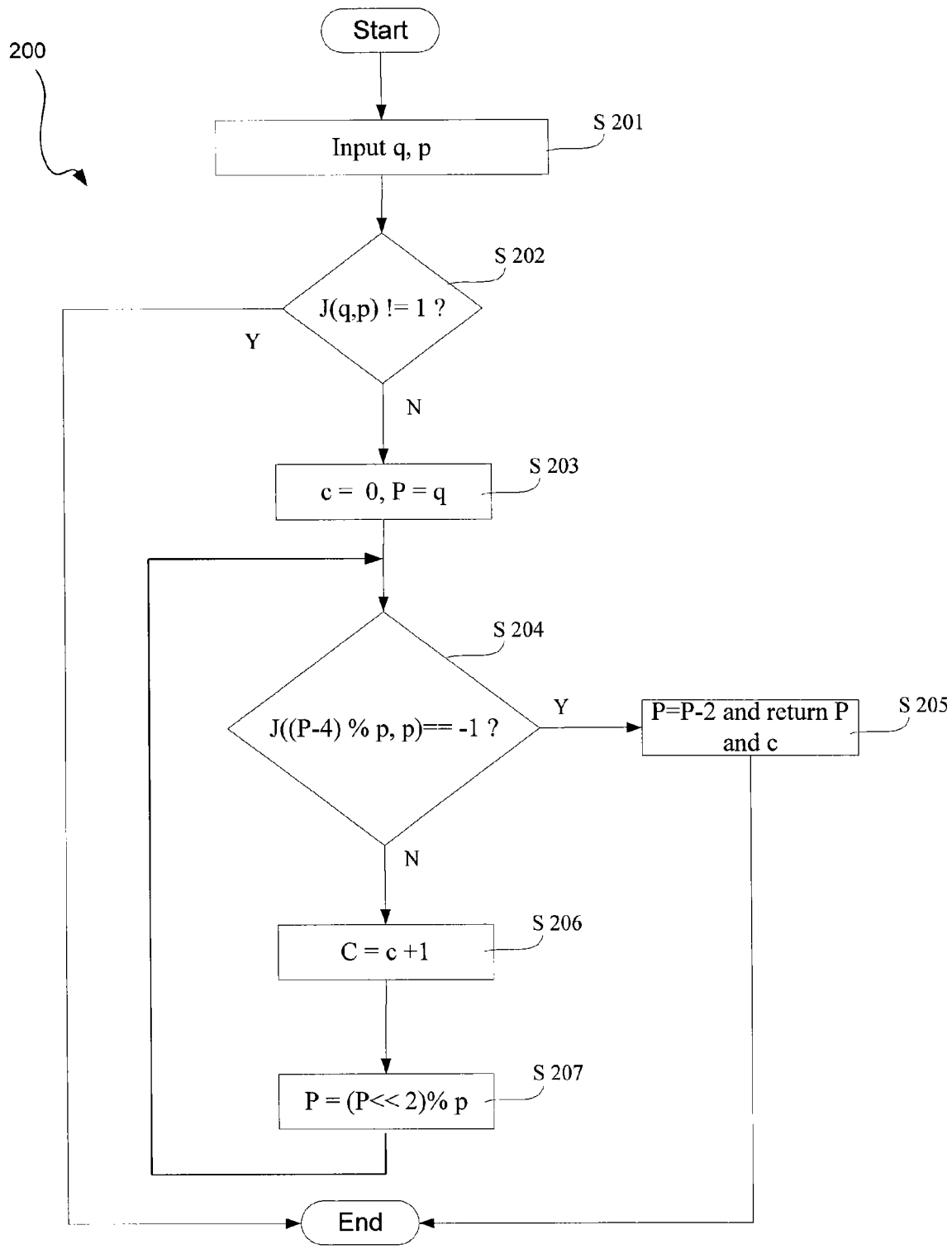
FIG. 2 illustrates a method to compute an initial value for a Lucas parameter.

FIG. 2 depicts a method 200, to compute an initial value for a Lucas parameter. To compute an initial value of the parameter P, the method of FIG. 2 utilizes a Jacobi symbol, which is a generalization of the Legendre symbol when the modulus concerned is not prime. Since we need to determine if values are quadratic residues only modulo a prime value p, the Legendre symbol and the Jacobi symbol are equivalent. We will use the Jacobi symbol in this exposition. For the sake of completeness, we first define a Jacobi symbol.

For any integer a and any positive odd integer n, the Jacobi symbol is defined as the product of the Legendre symbols corresponding to the prime factors of n, that can be expressed as follows:

$$\left(\frac{a}{n}\right) = \left(\frac{a}{p_1}\right)^{a_1} \left(\frac{a}{p_2}\right)^{a_2} \dots \left(\frac{a}{p_k}\right)^{a_k} \quad (11)$$

where $$n = p_1^{a_1} p_2^{a_2} \dots p_k^{a_k}$$

wherein (a/p) represents the Legendre symbol, defined for all integers a and all odd primes p as follows:

$$\left(\frac{a}{p}\right) = \begin{cases} 0 & \text{if } a \equiv 0 \pmod{p} \\ +1 & \text{if } a \not\equiv 0 \pmod{p} \text{ and for some integer } x, \\ & a \equiv x^2 \pmod{p} \\ -1 & \text{if there is no such } x. \end{cases} \quad (12)$$

In step S201, the input parameter p (elliptic curve parameter) is set, in one embodiment, to $p_{244}$ which is equal to $2^{224}-2^{96}+1$. Further, q is an integer whose square root is desired, is input.

In step S202, the Jacobi symbol of the parameters q and p is first computed. This is represented as J(q,p). A query is made to check if the Jacobi symbol of the parameters q and p is not equal to one. If the response to the query is affirmative, the process simply ends, signifying that q does not have a square root. If the response to the query in step S202 is affirmative, the process proceeds to step S203. Alternatively, the process can skip this check and instead test to see if the result of the square root computation is correct by simply squaring it and testing the result. This is more efficient if invalid inputs (that is, inputs that have no square roots) are rare.

In step S203, a counter c is initialized to zero and the Lucas parameter P is assigned q as its initial value.

In step S204, a query is made to check if the Jacobi symbol of the parameters (P−4) % p, p is equal to −1, where % represents mod. If the response to the query is affirmative the values of c and P are output in step S205, after which the process ends. The value of P output is equal to $qt^2-2$ for some element t, where $t=2^c$. If the response to the query in step S204 is negative, the process moves to step S206.

In step S206, the value of the counter c is incremented by one.

Further, in step S207, the value of the parameter P is left shifted by 2 bits and a modulo p operation is performed. This newly computed value of P is then fed to step S204, wherein the process repeats the Jacobi symbol computations with updated values.

Note that according to another embodiment, the smaller factors of the parameter $(p_{244}-1)/4$, by utilizing the Lucas multiplicative property of (9) and a binary expansion method can be utilized for the larger factors. Further, by the method presented in FIGS. 1 and 2, the number of squaring and multiplication operations can be reduced considerably.

Figure 3:
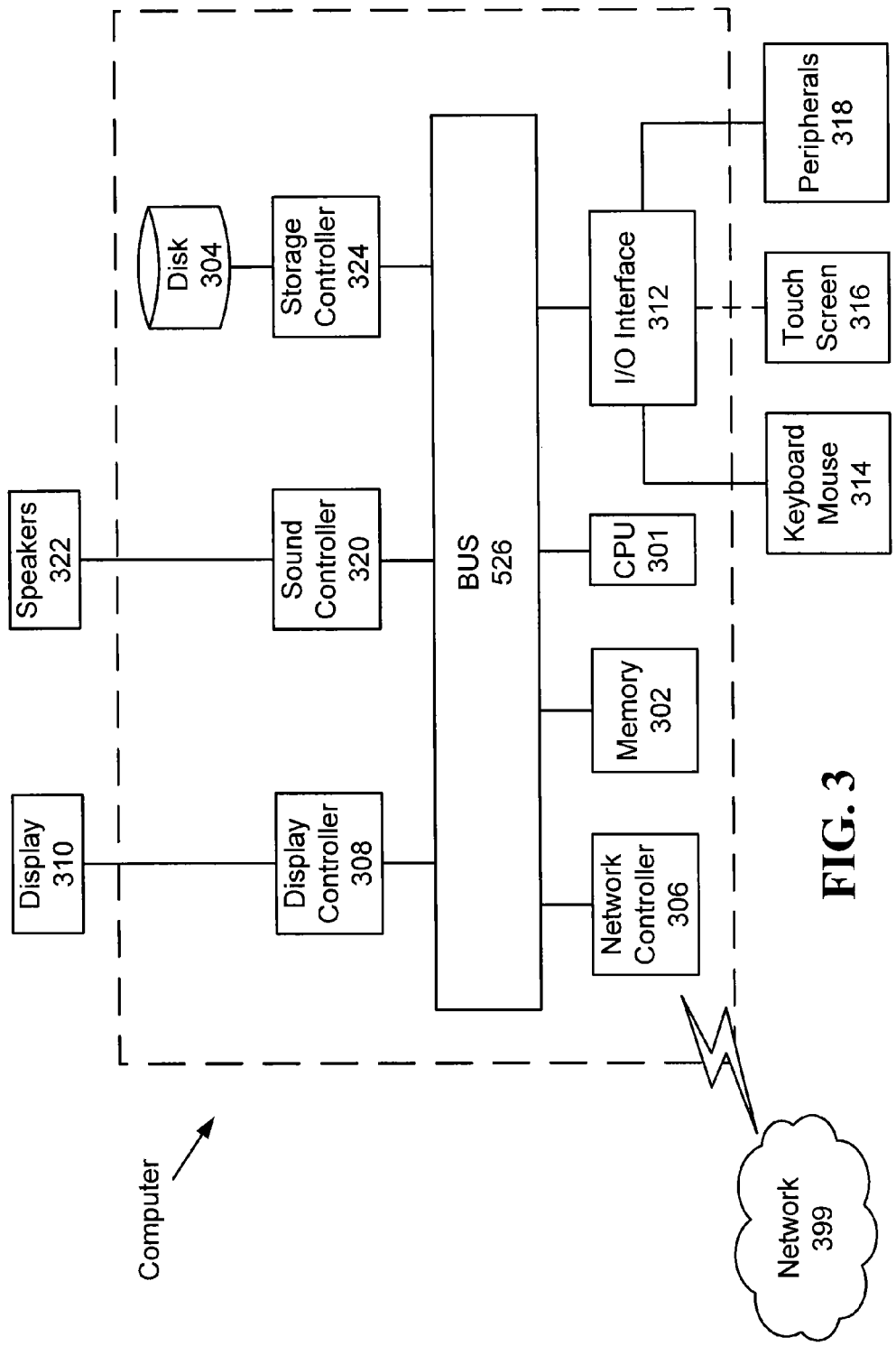
FIG. 3 shows a block diagram of a computer according to an exemplary embodiment.

In FIG. 3 the computer includes a CPU 300 that performs the processes described above.

The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server.

Further, the claimed advancements may be provided as a utility application, background daemon, or component of an operating system, or combination thereof, executing in conjunction with CPU 300 and an operating system such as Microsoft Windows 7, UNIX, Solaris, LINUX, Apple MAC-OS and other systems known to those skilled in the art.

CPU 301 may be a Xenon or Core processor from Intel of America or an Opteron processor from AMD of America, or may be other processor types that would be recognized by one of ordinary skill in the art. Alternatively, the CPU 301 may be implemented on an FPGA, ASIC, PLD or using discrete logic circuits, as one of ordinary skill in the art would recognize. Further, CPU 301 may be implemented as multiple processors cooperatively working in parallel to perform the instructions of the inventive processes described above.

The computer in FIG. 3 also includes a network controller 306, such as an Intel Ethernet PRO network interface card from Intel Corporation of America, for interfacing with network 399. As can be appreciated, the network 399 can be a public network, such as the Internet, or a private network such as an LAN or WAN network, or any combination thereof and can also include PSTN or ISDN sub-networks. The network 399 can also be wired, such as an Ethernet network, or can be wireless such as a cellular network including EDGE, 3G and 4G wireless cellular systems. The wireless network can also be WiFi, Bluetooth, or any other wireless form of communication that is known. The network controller 306 may be used to establish a communication channel between the two parties, possibly through the network 399.

The computer further includes a display controller 308, such as a NVIDIA GeForce GTX or Quadro graphics adaptor from NVIDIA Corporation of America for interfacing with display 310, such as a Hewlett Packard HPL2445w LCD monitor. A general purpose I/O interface 312 interfaces with a keyboard and/or mouse 514 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the computer, such as Sound Blaster X-Fi Titanium from Creative, to interface with speakers/microphone 322 thereby providing sounds and/or music. The speakers/microphone 322 can also be used to accept dictated words as commands for controlling the computer or for providing location and/or property information with respect to the target property.

The general purpose storage controller 324 connects the storage medium disk 304 with communication bus 326, which may be an ISA, EISA, VESA, PCI, or similar, for interconnecting all of the components of the computer. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

In the above description, any processes, descriptions or blocks in flowcharts should be understood to represent modules, segments, or portions of code that include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method of computing a square root of an element q of a prime finite field, the method comprising:
   determining a value of a finite field element t yielding an initial value P=q*t*t−2 such that P−2 is not a quadratic residue, wherein P is an initial parameter of a Lucas function;
   calculating a factored representation of (p−1)/4, the factored representation consisting of a set of factors that, when multiplied together, yield (p−1)/4, wherein p is a characteristic of the prime finite field on which coordinates of an elliptic curve are defined;

calculating a value of the Lucas function of P for one of the factors of the set of factors;

setting P to the computed Lucas function value;

computing a Lucas function value of P for another factor of the set of factors;

repeating the setting and computing steps for all remaining factors of the set of factors in the factored representation of (p−1)/4 to generate a final Lucas function value;

outputting the square root of the finite field element q, the square root being calculated as the final Lucas function value divided by the element t; and using the square root of the finite field element q in at least one digital signature cryptographic application.

2. The method of claim 1, wherein the Lucas function has two parameters P and Q, and Q=1.

3. The method of claim 1, wherein the initial value P is computed based on one of a Jacobi symbol computation and a Legendre symbol computation.

4. The method of claim 1, wherein the element t equals $2^c$, wherein c is an integer.

5. The method of claim 1, wherein the calculating step comprises calculating a prime factorization of (p−1)/4 as the factored representation of (p−1)/4.

6. The method of claim 5, wherein $p=2^{224}-2^{96}+1$ and the prime factorization of (p−1)/4 is $2^{94}$, 3, 5, 17, 257, 641, 65537, 274177, 6700417, and 6728021310721.

7. The method of claim 1, where the step of calculating the value of the Lucas function of P comprises:

determining a Lucas sub-sequence using an heuristic search; and calculating the value of the Lucas function of P using the determined Lucas sub-sequence.

8. The method of claim 7, wherein the step of determining a Lucas sub-sequence comprises determining a minimum-length Lucas sub-sequence.

9. An apparatus to perform a square root computation of an element q of a prime finite field, comprising:

a processor configured to:

determine a value of a finite field element t yielding an initial value P=q*t*t−2 such that P−2 is not a quadratic residue, wherein P is an initial parameter of a Lucas function;

calculate a factored representation of (p−1)/4, the factored representation consisting of a set of factors that, when multiplied together, yield (p−1)/4, wherein p is a characteristic of the prime finite field on which coordinates of an elliptic curve are defined;

calculate a value of the Lucas function of P for one of the factors of the set of factors;

set P to the computed Lucas function value;

compute a Lucas function value of P for another factor of the set of factors;

repeat the setting and computing steps for all remaining factors of the set of factors in the factored representation of (p−1)/4 to generate a final Lucas function value;

output the square root of the finite field element q, the square root being calculated as the final Lucas function value divided by the element t; and use the square root of the finite field element q in at least one digital signature cryptographic application.

10. The apparatus to perform a square root computation of claim 9, wherein the Lucas function has two parameters P and Q, and Q=1.

11. The apparatus to perform a square root computation of claim 9, wherein the initial value P is computed based on one of a Jacobi symbol computation and a Legendre symbol computation.

12. The apparatus to perform a square root computation of claim 9, wherein the element t equals $2^c$, wherein c is an integer.

13. The apparatus to perform a square root computation of claim 9, wherein the calculating step comprises calculating a prime factorization of (p−1)/4 as the factored representation of (p−1)/4.

14. The apparatus to perform a square root computation of claim 13, wherein $p=2^{224}-2^{96}+1$ and the prime factorization of (p−1)/4 is $2^{94}$, 3, 5, 17, 257, 641, 65537, 274177, 6700417, and 6728021310721.

15. The apparatus to perform a square root computation of claim 9, where the step of calculating the value of the Lucas function of P comprises:

determining a Lucas sub-sequence using an heuristic search; and calculating the value of the Lucas function of P using the determined Lucas sub-sequence.

16. The apparatus to perform a square root computation of claim 15, wherein the step of determining a Lucas sub-sequence comprises determining a minimum-length Lucas sub-sequence.

17. A non-transitory computer-readable medium having stored thereon a program that when executed by a computer causes the computer to execute the steps of:

determining a value of a finite field element t yielding an initial value P=q*t*t−2 such that P−2 is not a quadratic residue;

calculating a factored representation of (p−1)/4, wherein p is a characteristic of the prime finite field on which coordinates of an elliptic curve are defined, the factored representation consisting of a set of factors that, when multiplied together, yield (p−1)/4;

calculating a value of the Lucas function of P for one of the factors of the set of factors;

setting P to the computed Lucas function value;

computing a Lucas function value of P for another factor of the set of factors;

repeating the setting and computing steps for all remaining factors of the set of factors in the factored representation of (p−1)/4 to generate a final Lucas function value;

outputting the square root of the finite field element q, the square root being calculated as the final Lucas function value divided by the element t; and using the square root of the finite field element q in at least one digital signature cryptographic application.

18. The non-transitory computer-readable medium of claim 17, wherein the Lucas function has two parameters P and Q, and Q=1.

19. The non-transitory computer-readable medium of claim 17, wherein the calculating step comprises calculating a prime factorization of (p−1)/4 as the factored representation of (p−1)/4.

20. The non-transitory computer-readable medium of claim 19, wherein $p=2^{224}-2^{96}+1$ and the prime factorization of (p−1)/4 is $2^{94}$, 3, 5, 17, 257, 641, 65537, 274177, 6700417, and 6728021310721.

* * * * *